H. V. LOUGH.
MOLD AND CLAMP THEREFOR.
APPLICATION FILED JULY 31, 1919.

1,367,404.

Patented Feb. 1, 1921.

Inventor.
Hector V. Lough,
By his Attorney.
Ernest Hopkinson

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

MOLD AND CLAMP THEREFOR.

1,367,404.

Specification of Letters Patent.   Patented Feb. 1, 1921.

Application filed July 31, 1919. Serial No. 314,515.

*To all whom it may concern:*

Be it known that I, HECTOR V. LOUGH, a subject of the King of Great Britain, residing at Hartford, county of Hartford, and State of Connecticut, have invented certain new and useful Improvements in Molds and Clamps Therefor, of which the following is a full, clear, and exact description.

This invention relates to sectional molds for vulcanizing rubber articles and especially the clamps used in conjunction therewith to hold the sections of a mold against separation by pressure applied internally thereof.

Heretofore molds have been variously shaped to receive clamps of one form or another but these prior constructions have not been capable of that quick and easy assemblage or disassemblage which it is an aim of the present invention to provide together with durability, strength and low cost in their manufacture. The invention further aims to attain the above objects in a type of construction which permits a plurality of molds to be stacked upon one another. And still further it aims to provide a type of clamp that is sunk or embraced within the general outlines of the mold when in normal working position.

The invention consists essentially of a plurality of mating sections preferably of annular form shaped to impart a desired configuration to an article vulcanized therewithin, and of a plurality of holding members or clamps of preferably dumb bell shape which are individually adapted to enter slots in the periphery of the sections and to hold the sections when assembled against displacement by an internal fluid pressure or other medium tending to separate them.

The invention is illustrated in the accompanying drawings in which.

Figure 1:
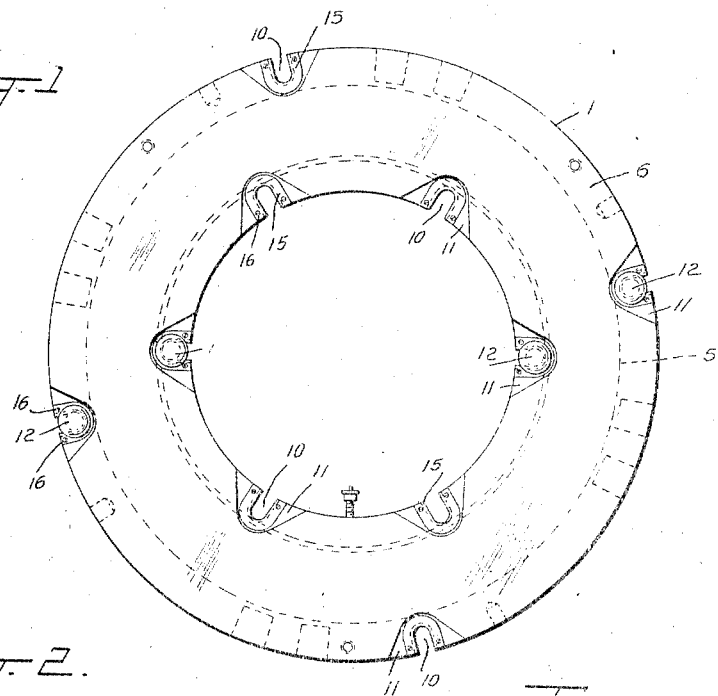
Figure 1 is a plan view of a sectional mold embodying the invention with some of the clamps or holding members in place.
Figure 2:
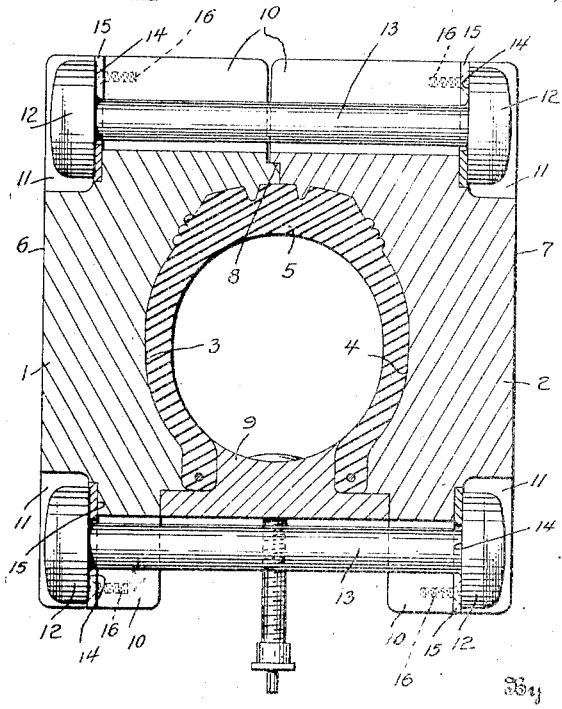
Fig. 2 is a section of the same.
Figure 3:
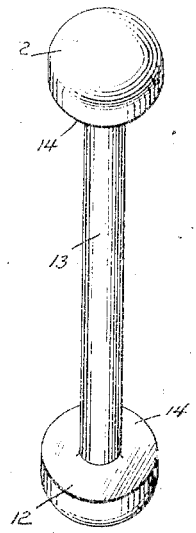
Fig. 3 shows one of the unitary clamps or holding members in perspective.

The invention is illustrated applied to an internal fluid pressure type of mold comprising opposed sections 1 and 2 having reversely curved or hollowed inner faces 3 and 4 respectively which impart the desired configuration to an article such as a tire 5 and outer faces 6 and 7 which are preferably flat but may be shaped otherwise to permit stacking a plurality of molds in a press preliminary to a vulcanizing heat treatment thereof. The sections 1 and 2 are provided with the usual lap joint indicated generally by the numeral 8 for closing off the article cavity at the tread portion of the tire, if the article be a tire, whose beaded portion may be closed off in various suitable ways as for instance by the bull ring 9 or by the neck of an internal core such as disclosed in patent to Hopkinson, 1,289,774, granted Dec. 31, 1918. The specific means for closing off the article cavity forms no part of the present invention which it is to be understood is not limited to any particular type of sectional mold whether final or setting or howsoever subjected to pressure.

The foregoing relates to general and old construction; what follows pertains to the improved features constituting more particularly the present invention.

The mold sections 1 and 2 are formed in their outer and inner periphery in directions transverse and preferably at right angles to the plane of the mold to form the slots 10. In its outer face each section is notched as indicated at 11 around the ends of the slots to receive the heads 12 of clamps or holding members 13, both heads 12 being preferably, but not necessarily, integral with the intermediate reduced portion inasmuch as nuts (not shown) could be substituted for one or both of the heads, if desired. The opposed faces 14 of the heads 12 are preferably, but not necessarily, made parallel, or substantially so, and they are spaced apart a distance permitting ready insertion of the clamps in the slots 10 without allowing an appreciable or prohibitive endwise movement thereof. U-shaped wear plates 15 of steel or other durable metal may be secured by screws 16 or otherwise in the notches 11 around the open ends of the slots 10.

In use the sections of the mold are assembled about the article or tire with lapped joint 8 closed and the respective pairs of slots 10 in alinement when the clamps or holding members 13 may be readily inserted in the slots 10 to their normal working position in which they are located preferably entirely within the outlines of the mold, both at its outer side faces and at its periphery. When internal pressure is applied to the sections of the mold tending to separate them, the clamps hold the sections in fixed relation, predetermined by the distance between the opposed faces 14 of the clamps.

The dumb-bell clamps are simple and strong, and require no skill and very little time to manipulate. They do not project beyond the outlines of the assembled sections either at the sides or peripherally and are not likely to be accidentally disengaged. The clamps being arranged wholly within the periphery of the mold sections are subjected to a pure tension in their reduced portion and to a pure shearing stress at the junction of the heads with the reduced portion. They are in a well balanced position free from bending stresses, and in the parallel arrangement of the opposed faces 14 there is no tendency for the clamps to shift when pressure is applied internally of the molds, as in some prior devices.

Having thus described my invention, what I claim as new and desire to protect by Letters Patent is:

1. A mold for vulcanizing rubber articles including complementary annular sections shaped internally to impart the desired external configuration to the article, and bodily removable members for holding said sections against relative lateral displacement beyond a predetermined limit, said sections being shaped to receive said members completely within their outlines when assembled however viewed whereby projections likely to be disengaged in the handling of the molds are avoided.

2. A mold for annular bodies including in combination complementary concave annular sections provided peripherally with transversely disposed slots, and integral holding members of fixed and invariable length shaped to enter said slots and to engage both marginal walls of each of said slots at opposite sides of the mold.

3. A mold for annular bodies including in combination complementary concave annular sections provided peripherally with transversely disposed slots and terminating in notches in the outside face of each of the sections, and holding members of fixed length shaped to enter said slots and to engage the marginal slots at opposite ends thereof and within the notches.

4. A mold for annular articles including in combination, opposed concave annular sections provided peripherally with registering slots terminating in enlarged notches, each slot extending transverse the plane of its section, and members for holding said sections in fixed relation, said members each comprising a tension resisting portion insertible in a slot and shear resisting portions each adapted to engage the bottom wall of a notch at opposite sides of a slot and said members lying entirely within the outline of the assembled sections when inserted in working position.

5. A mold for annular rubber articles including in combination opposed annular and substantially circular sections each shaped on one side to impart a desired external configuration to the articles and on the other side to permit the stacking of a plurality of molds, each of said sections being provided radially with open-ended slots which register with similar slots in the other sections, and members for holding said sections against displacement when assembled about the article, said members having a reduced portion insertible in said slots to a position within the periphery of the sections and heads fixed at opposite ends of the reduced portions which are adapted to engage the sections beyond the ends of the slots, said sections being substantially free of projections on their outer peripheries.

6. A mold for annular rubber articles including in combination a pair of complementary annular sections each of which has an inner concave and an outer flat face, which latter face is designed to permit stacking a plurality of the molds, said sections being respectively provided with registering slots terminating in enlarged notches adjacent the flat faces, and elongated members headed at their opposite ends and of a maximum length not exceeding the distance between the flat faces of assembled sections, said members being bodily insertible in said slots by movement in planes transverse the planes of the outer flat faces of the sections.

7. A mold for annular rubber articles including in combination a pair of complementary annular sections each of which has an inner concave and an outer flat face, which latter face is designed to permit stacking a plurality of the molds, said sections being respectively provided with registering slots terminating in enlarged notches adjacent the flat faces, elongated members headed at their opposite ends and of a maximum length not exceeding the distances between the flat faces of assembled sections, said members being bodily insertible in said slots by movement in planes transverse the planes of the outer flat faces of the sections, and a wear plate in said notches engageable by the heads of the elongated members.

8. A vulcanizing mold having a pair of mating annular sections each provided in its maximum and minimum periphery with slots terminating in notches, and a plurality of similar one-piece holding members bodily movable to and from their normal working position in said slots where they are located entirely within the outlines of the assembled sections.

9. A vulcanizing mold having a pair of mating annular sections shaped to impart the desired configuration to an article, each of said sections being provided with a plurality of slots registering with similar slots in the other section, and a corresponding plurality of solid dumb bell shaped clamps removably fitting into said slots.

Signed at Hartford, county of Hartford, and State of Connecticut, this 11th day of July, 1919.

HECTOR V. LOUGH.